United States Patent
Tokgoz et al.

(10) Patent No.: US 9,065,584 B2
(45) Date of Patent: Jun. 23, 2015

(54) METHOD AND APPARATUS FOR ADJUSTING RISE-OVER-THERMAL THRESHOLD

(75) Inventors: Yeliz Tokgoz, San Diego, CA (US);
Mehmet Yavuz, San Diego, CA (US);
Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 13/246,491

(22) Filed: Sep. 27, 2011

(65) Prior Publication Data
US 2012/0258746 A1    Oct. 11, 2012

Related U.S. Application Data

(60) Provisional application No. 61/387,891, filed on Sep. 29, 2010.

(51) Int. Cl.
*H04B 15/00* (2006.01)
*H04J 11/00* (2006.01)

(52) U.S. Cl.
CPC .................. *H04J 11/0059* (2013.01)

(58) Field of Classification Search
CPC .................................................... H04W 28/04
USPC ............ 455/501, 500, 517, 67.11, 63.1, 63.2, 455/65, 550.1, 509, 507, 524, 525, 561, 455/562.1, 422, 403, 445, 423–425, 426.1, 455/426.2; 370/310, 328, 329, 343, 338
See application file for complete search history.

(56) References Cited

U.S. PATENT DOCUMENTS

| | | | |
|---|---|---|---|
| 5,329,530 | A | 7/1994 | Kojima |
| 5,528,597 | A | 6/1996 | Gerszberg et al. |
| 5,579,373 | A | 11/1996 | Jang |
| 5,582,597 | A | 12/1996 | Brimhall et al. |

(Continued)

FOREIGN PATENT DOCUMENTS

| | | |
|---|---|---|
| CA | 2538576 A1 | 9/2006 |
| CN | 1140938 A | 1/1997 |

(Continued)

OTHER PUBLICATIONS

Akin David: "Spectral Masks and Interference" CWNP Wireless Certification & Wireless Training, [Online] Sep. 20, 2007, XP002514078, Retreived From The Internet: URL:http://www.cwnp.com/community/articles/spectral_masks_and_interference.html> [retrieved on Feb. 2005.

(Continued)

*Primary Examiner* — Keith Ferguson

(57) ABSTRACT

Methods and apparatuses are provided that include adaptively configuring a rise-over-thermal (RoT) threshold at a base station to improve communications with one or more devices while mitigating interference to one or more other base stations. A potential device pathloss to the macrocell can be computed based on a measured pathloss thereto applied with a coverage area of the low power base station to emulate a worst-case device, one or more received measurement reports, and/or the like. The RoT threshold can be computed based at least in part on the pathloss and/or a maximum interference level at the macrocell. In addition, the RoT threshold can be adapted based on a reverse link attenuation level.

32 Claims, 11 Drawing Sheets

(56) References Cited

U.S. PATENT DOCUMENTS

| | | |
|---|---|---|
| 5,594,720 A | 1/1997 | Papadopoulos et al. |
| 5,722,063 A | 2/1998 | Peterzell et al. |
| 5,758,271 A | 5/1998 | Rich et al. |
| 5,787,346 A | 7/1998 | Iseyama |
| 5,852,630 A | 12/1998 | Langberg et al. |
| 5,892,796 A | 4/1999 | Rypinski |
| 6,005,856 A | 12/1999 | Jensen et al. |
| 6,038,223 A | 3/2000 | Hansson et al. |
| 6,061,549 A | 5/2000 | Labonte et al. |
| 6,107,878 A | 8/2000 | Black |
| 6,301,242 B1 | 10/2001 | Lindsay et al. |
| 6,496,706 B1 | 12/2002 | Jou et al. |
| 6,535,739 B1 | 3/2003 | Chen et al. |
| 6,577,671 B1 | 6/2003 | Vimpari |
| 6,594,238 B1 | 7/2003 | Wallentin et al. |
| 6,597,668 B1 | 7/2003 | Schafer et al. |
| 6,597,705 B1 | 7/2003 | Rezaiifar et al. |
| 6,680,902 B1 | 1/2004 | Hudson |
| 6,690,657 B1 | 2/2004 | Lau et al. |
| 6,765,898 B1 | 7/2004 | Bloch |
| 6,768,444 B2 | 7/2004 | Langsford |
| 6,879,829 B2 | 4/2005 | Dutta et al. |
| 7,003,310 B1 | 2/2006 | Youssefmir et al. |
| 7,012,912 B2 | 3/2006 | Naguib et al. |
| 7,016,319 B2 | 3/2006 | Baum et al. |
| 7,035,590 B2 | 4/2006 | Ishiguro et al. |
| 7,099,298 B2 | 8/2006 | Kim |
| 7,106,707 B1 | 9/2006 | Strutt |
| 7,139,284 B1 | 11/2006 | Furukawa et al. |
| 7,155,655 B2 | 12/2006 | Cheng |
| 7,162,204 B2 | 1/2007 | Hansen et al. |
| 7,185,257 B2 | 2/2007 | Kim et al. |
| 7,239,622 B2 | 7/2007 | Black |
| 7,260,761 B2 | 8/2007 | Dottling et al. |
| 7,266,393 B2 | 9/2007 | Latva-Aho et al. |
| 7,302,276 B2 | 11/2007 | Bernhardsson et al. |
| 7,373,128 B2 | 5/2008 | Dowling |
| 7,379,958 B2 | 5/2008 | Karhu |
| 7,401,236 B2 | 7/2008 | Adachi |
| 7,430,431 B2 | 9/2008 | Harris et al. |
| 7,468,966 B2 | 12/2008 | Baker et al. |
| 7,489,720 B2 | 2/2009 | Hinton et al. |
| 7,492,751 B2 | 2/2009 | Kim |
| 7,515,563 B2 | 4/2009 | Ponnekanti |
| 7,519,324 B2 | 4/2009 | Jacomb-Hood et al. |
| 7,525,909 B2 | 4/2009 | Fan et al. |
| 7,539,165 B2 | 5/2009 | Toskala et al. |
| 7,539,501 B2 | 5/2009 | Moorti et al. |
| 7,555,300 B2 | 6/2009 | Scheinert et al. |
| 7,564,827 B2 | 7/2009 | Das et al. |
| 7,574,179 B2 | 8/2009 | Barak et al. |
| 7,620,370 B2 | 11/2009 | Barak et al. |
| 7,627,293 B2 | 12/2009 | Bhandari et al. |
| 7,680,026 B2 | 3/2010 | Stopler |
| 7,693,125 B2 | 4/2010 | Ihm et al. |
| 7,756,519 B2 | 7/2010 | Barak et al. |
| 7,764,661 B2 | 7/2010 | Heo et al. |
| 7,839,939 B2 | 11/2010 | Lee et al. |
| 7,864,744 B2 | 1/2011 | Song et al. |
| 7,864,877 B2 | 1/2011 | Hottinen |
| 7,903,628 B2 | 3/2011 | Akkarakaran et al. |
| 7,907,571 B2 | 3/2011 | Raghothaman et al. |
| 7,920,544 B2 | 4/2011 | Soliman et al. |
| 7,974,230 B1 | 7/2011 | Talley et al. |
| 8,060,104 B2 | 11/2011 | Chaudhri et al. |
| 8,139,518 B2 | 3/2012 | Blessent et al. |
| 8,254,279 B2 | 8/2012 | Wheatley et al. |
| 8,483,620 B2 | 7/2013 | Horn et al. |
| 8,700,083 B2 | 4/2014 | Yavuz et al. |
| 8,712,461 B2 | 4/2014 | Yavuz et al. |
| 8,848,619 B2 | 9/2014 | Nanda et al. |
| 2001/0049295 A1 | 12/2001 | Matsuoka et al. |
| 2002/0051433 A1 | 5/2002 | Affes et al. |
| 2002/0136179 A1 | 9/2002 | Aoyama et al. |
| 2002/0154621 A1 | 10/2002 | Laroia et al. |
| 2002/0167907 A1 | 11/2002 | Sarkar et al. |
| 2002/0168993 A1 | 11/2002 | Choi et al. |
| 2003/0086364 A1 | 5/2003 | Horne |
| 2003/0109274 A1 | 6/2003 | Budka et al. |
| 2003/0128679 A1 | 7/2003 | Ishiguro et al. |
| 2003/0206576 A1 | 11/2003 | Seo |
| 2004/0092281 A1 | 5/2004 | Burchfiel |
| 2004/0114552 A1 | 6/2004 | Lim et al. |
| 2004/0141568 A1 | 7/2004 | Huat |
| 2004/0147287 A1 | 7/2004 | Nelson, Jr. et al. |
| 2004/0151264 A1 | 8/2004 | Montojo et al. |
| 2004/0160925 A1 | 8/2004 | Heo et al. |
| 2004/0179480 A1 | 9/2004 | Attar et al. |
| 2005/0003827 A1 | 1/2005 | Whelan |
| 2005/0070287 A1 | 3/2005 | Cave et al. |
| 2005/0135308 A1 | 6/2005 | Vijayan et al. |
| 2005/0201351 A1 | 9/2005 | Nakao |
| 2005/0286547 A1 | 12/2005 | Baum et al. |
| 2006/0018279 A1 | 1/2006 | Agrawal et al. |
| 2006/0019679 A1 | 1/2006 | Rappaport et al. |
| 2006/0019694 A1 | 1/2006 | Sutivong et al. |
| 2006/0039273 A1 | 2/2006 | Gore et al. |
| 2006/0094436 A1 | 5/2006 | Kim et al. |
| 2006/0104242 A1 | 5/2006 | Kim et al. |
| 2006/0104254 A1 | 5/2006 | Shin et al. |
| 2006/0111137 A1 | 5/2006 | Mori et al. |
| 2006/0116154 A1 | 6/2006 | Han |
| 2006/0120471 A1 | 6/2006 | Learned et al. |
| 2006/0209721 A1 | 9/2006 | Mese et al. |
| 2006/0262754 A1 | 11/2006 | Andersson et al. |
| 2007/0004423 A1 | 1/2007 | Gerlach et al. |
| 2007/0010203 A1 | 1/2007 | Wee et al. |
| 2007/0047552 A1 | 3/2007 | Astely |
| 2007/0087749 A1 | 4/2007 | Ionescu et al. |
| 2007/0105573 A1 | 5/2007 | Gupta et al. |
| 2007/0147226 A1 | 6/2007 | Khandekar et al. |
| 2007/0153749 A1 | 7/2007 | Waxman |
| 2007/0173199 A1 | 7/2007 | Sinha |
| 2007/0191051 A1 | 8/2007 | Suonvieri |
| 2007/0259682 A1 | 11/2007 | Kaikkonen et al. |
| 2007/0270155 A1 | 11/2007 | Nelson, Jr. et al. |
| 2007/0275729 A1 | 11/2007 | Kashima et al. |
| 2008/0008147 A1 | 1/2008 | Nakayama |
| 2008/0031144 A1 | 2/2008 | Kawamoto et al. |
| 2008/0039129 A1 | 2/2008 | Li et al. |
| 2008/0062925 A1 | 3/2008 | Mate et al. |
| 2008/0069186 A1 | 3/2008 | Rice |
| 2008/0076407 A1 | 3/2008 | Shitara |
| 2008/0080364 A1 | 4/2008 | Barak et al. |
| 2008/0089296 A1 | 4/2008 | Kazmi et al. |
| 2008/0101212 A1 | 5/2008 | Yu et al. |
| 2008/0144493 A1 | 6/2008 | Yeh |
| 2008/0222021 A1 | 9/2008 | Stanforth et al. |
| 2008/0225966 A1 | 9/2008 | Tseng et al. |
| 2008/0242243 A1 | 10/2008 | Kikuchi |
| 2008/0280575 A1 | 11/2008 | Pesola |
| 2008/0297415 A1 | 12/2008 | Berens et al. |
| 2008/0298488 A1 | 12/2008 | Shen et al. |
| 2008/0316957 A1 | 12/2008 | Shen et al. |
| 2009/0003305 A1 | 1/2009 | Gerstenberger et al. |
| 2009/0011765 A1 | 1/2009 | Inoue et al. |
| 2009/0017832 A1 | 1/2009 | Tebbs et al. |
| 2009/0042593 A1 | 2/2009 | Yavuz et al. |
| 2009/0042596 A1 | 2/2009 | Yavuz et al. |
| 2009/0046632 A1 | 2/2009 | Nanda et al. |
| 2009/0047931 A1 | 2/2009 | Nanda et al. |
| 2009/0052395 A1 | 2/2009 | Bao et al. |
| 2009/0059907 A1 | 3/2009 | Sindhwani et al. |
| 2009/0069017 A1 | 3/2009 | Usuda et al. |
| 2009/0080386 A1 | 3/2009 | Yavuz et al. |
| 2009/0080499 A1 | 3/2009 | Yavuz et al. |
| 2009/0081970 A1 | 3/2009 | Yavuz et al. |
| 2009/0082026 A1 | 3/2009 | Yavuz et al. |
| 2009/0082027 A1 | 3/2009 | Yavuz et al. |
| 2009/0086861 A1 | 4/2009 | Yavuz et al. |
| 2009/0092111 A1 | 4/2009 | Horn et al. |
| 2009/0111473 A1 | 4/2009 | Tao et al. |
| 2009/0116393 A1 | 5/2009 | Hughes et al. |
| 2009/0135754 A1 | 5/2009 | Yavuz et al. |

(56) References Cited

U.S. PATENT DOCUMENTS

| | | | |
|---|---|---|---|
| 2009/0135790 A1 | 5/2009 | Yavuz et al. | |
| 2009/0135796 A1 | 5/2009 | Nanda et al. | |
| 2009/0137221 A1 | 5/2009 | Nanda et al. | |
| 2009/0137241 A1 | 5/2009 | Yavuz et al. | |
| 2009/0203320 A1 | 8/2009 | Horn et al. | |
| 2009/0203372 A1 | 8/2009 | Horn et al. | |
| 2009/0252099 A1 | 10/2009 | Black et al. | |
| 2009/0291690 A1 | 11/2009 | Guvenc et al. | |
| 2010/0086092 A1 | 4/2010 | Wiatrowski et al. | |
| 2010/0118996 A1 | 5/2010 | Sundaresan et al. | |
| 2010/0128630 A1 | 5/2010 | Barak et al. | |
| 2010/0136989 A1 | 6/2010 | Westerberg et al. | |
| 2010/0136998 A1 | 6/2010 | Lott et al. | |
| 2010/0178921 A1 | 7/2010 | Aqvist et al. | |
| 2010/0184423 A1 | 7/2010 | Kent et al. | |
| 2011/0009065 A1* | 1/2011 | Carter | 455/63.1 |
| 2011/0090827 A1 | 4/2011 | Kattwinkel | |
| 2011/0096708 A1 | 4/2011 | Novak et al. | |
| 2011/0255520 A1 | 10/2011 | Chu et al. | |
| 2014/0233416 A1 | 8/2014 | Black et al. | |
| 2014/0376520 A1 | 12/2014 | Yavuz et al. | |

FOREIGN PATENT DOCUMENTS

| | | | |
|---|---|---|---|
| CN | 1257385 A | 6/2000 | |
| CN | 1281326 A | 1/2001 | |
| CN | 1308824 A | 8/2001 | |
| CN | 1360804 A | 7/2002 | |
| CN | 1463511 A | 12/2003 | |
| CN | 1613224 A | 5/2005 | |
| CN | 1728582 A | 2/2006 | |
| CN | 1762117 A | 4/2006 | |
| CN | 1853315 A | 10/2006 | |
| CN | 1871573 A | 11/2006 | |
| CN | 1989775 A | 6/2007 | |
| CN | 101036314 A | 9/2007 | |
| CN | 101043406 A | 9/2007 | |
| CN | 101378534 A | 3/2009 | |
| CN | 100566291 C | 12/2009 | |
| CN | 101754314 A | 6/2010 | |
| EP | 0720405 A2 | 7/1996 | |
| EP | 1035742 A1 | 9/2000 | |
| EP | 1318613 A2 | 6/2003 | |
| EP | 1503534 A1 | 2/2005 | |
| EP | 1533910 A2 | 5/2005 | |
| EP | 1564912 A1 | 8/2005 | |
| EP | 1566917 A2 | 8/2005 | |
| EP | 1710920 A1 | 10/2006 | |
| EP | 1798884 A1 | 6/2007 | |
| EP | 1838118 A1 | 9/2007 | |
| GB | 2349045 | 10/2000 | |
| GB | 2367455 | 4/2002 | |
| GB | 2402023 A | 11/2004 | |
| IL | 197172 A | 1/2013 | |
| JP | 5122146 A | 5/1993 | |
| JP | 9163431 A | 6/1997 | |
| JP | 9200846 A | 7/1997 | |
| JP | 9238378 A | 9/1997 | |
| JP | H09261730 A | 10/1997 | |
| JP | 2000287250 A | 10/2000 | |
| JP | 2000316183 A | 11/2000 | |
| JP | 2001127679 A | 5/2001 | |
| JP | 2001251233 | 9/2001 | |
| JP | 2002050988 A | 2/2002 | |
| JP | 2002077043 A | 3/2002 | |
| JP | 2002094483 A | 3/2002 | |
| JP | 2002218528 A | 8/2002 | |
| JP | 2003018074 A | 1/2003 | |
| JP | 2003051775 A | 2/2003 | |
| JP | 2003174400 A | 6/2003 | |
| JP | 2003179450 A | 6/2003 | |
| JP | 2004260489 A | 9/2004 | |
| JP | 2005210703 A | 8/2005 | |
| JP | 2005278163 A | 10/2005 | |
| JP | 2005341415 A | 12/2005 | |
| JP | 2006135673 A | 5/2006 | |
| JP | 2006197639 A | 7/2006 | |
| JP | 2007074047 A | 3/2007 | |
| JP | 2007116730 A | 5/2007 | |
| JP | 2007129497 A | 5/2007 | |
| JP | 2007514367 A | 5/2007 | |
| JP | 2007527649 A | 9/2007 | |
| JP | 2007529915 A | 10/2007 | |
| JP | 2007306407 A | 11/2007 | |
| JP | 2008546235 A | 12/2008 | |
| JP | 4740241 B2 | 8/2011 | |
| KR | 20050055736 A | 6/2005 | |
| KR | 20060129219 A | 12/2006 | |
| KR | 20070064287 A | 6/2007 | |
| KR | 20100044895 A | 4/2010 | |
| RU | 2107994 C1 | 3/1998 | |
| RU | 2111619 C1 | 5/1998 | |
| RU | 2198467 C2 | 2/2003 | |
| RU | 2208880 C2 | 7/2003 | |
| RU | 2210864 | 8/2003 | |
| RU | 2210867 | 8/2003 | |
| RU | 2212093 | 9/2003 | |
| RU | 2002129901 A | 3/2004 | |
| RU | 2242091 C2 | 12/2004 | |
| RU | 2005111551 A | 9/2005 | |
| RU | 2276458 C2 | 5/2006 | |
| RU | 2278480 C2 | 6/2006 | |
| RU | 2300175 | 5/2007 | |
| RU | 2305363 | 8/2007 | |
| TW | 200421894 | 10/2004 | |
| WO | WO9512296 A1 | 5/1995 | |
| WO | 9908464 A1 | 2/1999 | |
| WO | 9933215 A1 | 7/1999 | |
| WO | 9949595 A1 | 9/1999 | |
| WO | 9960809 | 11/1999 | |
| WO | 0007377 A2 | 2/2000 | |
| WO | 0062435 A1 | 10/2000 | |
| WO | 0126269 A1 | 4/2001 | |
| WO | 0178440 A1 | 10/2001 | |
| WO | WO-03001834 A1 | 1/2003 | |
| WO | 03013190 A2 | 2/2003 | |
| WO | WO03032564 | 4/2003 | |
| WO | WO-2004028186 A2 | 4/2004 | |
| WO | 2004086636 A2 | 10/2004 | |
| WO | 2004114552 A1 | 12/2004 | |
| WO | WO-2004114715 A2 | 12/2004 | |
| WO | WO2005011145 | 2/2005 | |
| WO | 2005027265 A1 | 3/2005 | |
| WO | WO-2005057975 A1 | 6/2005 | |
| WO | WO2005062798 A2 | 7/2005 | |
| WO | WO-2006026715 A1 | 3/2006 | |
| WO | 2006038694 A1 | 4/2006 | |
| WO | WO-2006051867 A1 | 5/2006 | |
| WO | 2006127617 A2 | 11/2006 | |
| WO | WO-2006122805 A1 | 11/2006 | |
| WO | 2007007662 A1 | 1/2007 | |
| WO | 2007024895 A2 | 3/2007 | |
| WO | 2007077522 A2 | 7/2007 | |
| WO | 2007095860 A1 | 8/2007 | |
| WO | WO-2007090053 A1 | 8/2007 | |
| WO | 2007100032 A1 | 9/2007 | |
| WO | WO2007124111 A2 | 11/2007 | |
| WO | 2008024340 A2 | 2/2008 | |
| WO | 2008030934 A2 | 3/2008 | |
| WO | WO-2008134337 | 11/2008 | |
| WO | 2009039439 | 3/2009 | |
| WO | WO2010006909 A1 | 1/2010 | |

OTHER PUBLICATIONS

Co-pending U.S. Appl. No. 07/624,118, filed Dec. 7, 1990.
Fan et al., "Interference Management in Femto Cell Deployment", 3GPP2, S00-FEMTO-20071015-025_QCOM Femto Interference Management,Oct. 15, 2007.
Kim et al., "Femto Air Interface Deployment Modeling, Simulation, and Performance", 3GPP2, S00-FEMTO-20071015021_Airvana_ AirInterface_Modeling_Simulation_Performance_R3,Oct. 15, 2007.

(56) References Cited

OTHER PUBLICATIONS

Philips, "Text proposal for gating during compressed mode", TSGR1#19(01)0280, 3GPP, Mar. 2, 2001.

Vankka J., et al., "FIR Filters for Compensating D/A Converter Frequency Response Distribution", IEEE, pp. 105-108, 2002.

Wong et al., "Training sequence optimization in MIMO systems with colored interference," IEEE Trans. Commun., vol. 52, pp. 1939-1947, Nov. 2004.

3GPP2: Medium Access Control Layer for Ultra Mobile Broadband (UMB) Air Interface Specification, ver. 1.0, Apr. 2007 also at http://www.3gpp2.org/Public_html/specs/C.S0084-002-0_v1.0_070423.pdf . pp. 3 & 34-39.

Goldsmith, A.J. et al. "Adaptive Coded Modulation for Fading Channels," IEEE Transactions on Communications, vol. 46, No. 5 (May 1998), pp. 595-602.

Gruenheid R., et al., "Adaptive Modulation and Multiple Access for the OFDM Transmission Technique" May 1, 2000, Wireless Personal Communications, Springer, Dordrecht, NL, pp. 5-13, XP000894156 ISSN: 0929-6212 abstract p. 9, paragraph 5.2-p. 10.

International Search Report and Written Opinion—PCT/US2011/053739—ISA/EPO—Jan. 23, 2012.

Sean Ginevan: "Femtocells: Is There Room for Them on Your Network?" Internet Article Jul. 27, 2007, XP002510044 Retrieved from the Internet: URL:http://www.networkcomputing.com/article/printFullArticle.jhtml;jsessionid=GBC4GHJLLIWZCQSNDLPSKHSCJUNN2JVN?articleID=201201521> [retrieved on Jan. 13, 2009] Heading: "Show me the ROI".; p. 2.

Tokgoz, Y. et al., "Uplink Interference Management for HSPA+ and 1xEVDO Femtocells", Global Telecommunications Conference (GLOBECOM), 2009, IEEE, Piscataway, NJ, USA, Nov. 30, 2009, pp. 1-7, XP031645438, ISBN: 978-1-4244-4148-8.

U.S. Appl. No. 14/307,416, filed on Jun. 17, 2014 by Mehmet Yavuz (071700U4D1).

Wikipedia: "Puncturing", the free encyclopedia, URL: http://en.wikipedia.org/wiki/Puncturing. Retrieved on Apr. 23, 2014, p. 1.

Hansen C.J., "Thoughts on TX Spectral Masks for 802.11n," IEEE 802.11-04/0060r0, 2004, pp. 1-14.

3rd Generation Partnership Project; Technical Specification Group Radio Access Networks; FDD Home NodeB RF Requirements Work Item Technical Report (Release 8), 3GPP Standard; 3GPP TR 25.967, 3rd Generation Partnership Project (3GPP), Mobile Competence Centre; 650, Route Des Lucioles; F-06921 Sophia-Antipolis Cedex; France, No. 2.0.0, Feb. 1, 2009, pp. 1-58, XP05038087.

China Unicom et al., "Joint Proposal for 3GPP2 Physical Layer for FDD Spectra", C30-20060731-040R4_$_L$ _HKLLMNQRSUZ_—PP2Phase2_FDD_Proposal—1, 3GPP2, Jul. 31, 2006.

Huawei, "Cell re-selection for hNB," 3GPP TSG RAN2 #59 Tdoc R2-073159, 3GPP, Aug. 24, 2007, URL, http://www.3gpp.org/ftp/tsg_ran/WG2_RL2/TSGR2_59/Docs/R2-073159.zip.

* cited by examiner

METHOD AND APPARATUS FOR ADJUSTING RISE-OVER-THERMAL THRESHOLD

CLAIM OF PRIORITY UNDER 35 U.S.C. §119

The present Application for Patent claims priority to Provisional Application No. 61/387,891, entitled "ADAPTIVE RoT THRESHOLD AND REVERSE LINK ATTENUATION FOR LOW POWER BASE STATIONS" filed Sep. 29, 2010, assigned to the assignee hereof and hereby expressly incorporated by reference herein.

BACKGROUND

1. Field

The following description relates generally to wireless network communications, and more particularly to adjusting rise-over-thermal thresholds.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. In some configurations, such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

For example, low power base stations can be deployed within macrocell base station coverage areas. Since the conventional macrocell base stations operate at significantly higher power than low power base stations, communications with low power base stations can be easily interfered by macrocell base stations and/or devices communicating therewith. In this regard, low power base stations can set an allowable rise-over-thermal (RoT) threshold to improve device communications. For example, by increasing the RoT threshold, devices can continually increase transmission rate and consequently transmission power for communicating with the low power base station until the RoT threshold is attained, at which time the low power base station can notify the devices and/or send commands to limit uplink data rates/power thereto. The RoT threshold is additionally set to mitigate interference from the devices communicating with the low power base station to the macrocell base stations and/or devices communicating therewith. The RoT threshold is typically set as a fixed parameter at configuration for the low power base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with adapting a rise-over-thermal (RoT) threshold for a low power base station such that devices do not cause more than a maximum level of interference to another base station. For example, this can include ensuring a potential device in the worst case does not exceed a noise floor at another base station. In this regard, for example, the RoT threshold can be set according to various parameters measured and/or otherwise received at the low power base station. For example, the low power base station can estimate a pathloss of the potential device to the other base station based on a coverage area of the low power base station and a pathloss from the low power base station to the other base station. Based on the estimated pathloss, the low power base station can determine a RoT level at which the potential device could maintain an uplink SINR for communicating with the low power base station and still be received below a noise floor level at the other base station, and can configure the RoT threshold based on the determined RoT. In another example, the RoT can additionally or alternatively be computed based on pathloss differences computed from measurement reports received from one or more devices over a period of time, an applied reverse link attenuation, and/or the like.

According to an example, a method for managing uplink interference between devices communicating with a femto node and a macrocell base station is provided. The method includes determining a first pathloss at a potential device communicating with a femto node to a macrocell base station and determining a second pathloss at the potential device to the femto node. The method further includes generating a RoT threshold for the femto node based at least in part on a difference between the first pathloss and the second pathloss and a maximum interference level at the macrocell base station.

In another aspect, an apparatus for managing uplink interference between devices communicating with a femto node and a macrocell base station is provided. The apparatus includes at least one processor configured to determine a first pathloss at a potential device communicating with a femto node to a macrocell base station and determine a second pathloss at the potential device to the femto node. The at least one processor is further configured to generate a RoT threshold for the femto node based at least in part on a difference between the first pathloss and the second pathloss and a maximum interference level at the macrocell base station. The apparatus also includes a memory coupled to the at least one processor.

In yet another aspect, an apparatus for managing uplink interference between devices communicating with a femto node and a macrocell base station is provided that includes means for determining a first pathloss at a potential device communicating with a femto node to a macrocell base station and determining a second pathloss at the potential device to the femto node. The apparatus further includes means for generating a RoT threshold for the femto node based at least in part on a difference between the first pathloss and the second pathloss and a maximum interference level at the macrocell base station.

Still, in another aspect, a computer-program product for managing uplink interference between devices communicating with a femto node and a macrocell base station is provided including a computer-readable medium having code for causing at least one computer to determine a first pathloss at a potential device communicating with a femto node to a macrocell base station and code for causing the at least one computer to determine a second pathloss at the potential device to the femto node. The computer-readable medium further includes code for causing the at least one computer to generate a RoT threshold for the femto node based at least in part on a difference between the first pathloss and the second pathloss and a maximum interference level at the macrocell base station.

Moreover, in an aspect, an apparatus for managing uplink interference between devices communicating with a femto node and a macrocell base station is provided that includes a device pathloss determining component for determining a first pathloss at a potential device communicating with a femto node to a macrocell base station and determining a second pathloss at the potential device to the femto node. The apparatus further includes a RoT threshold computing component for generating a RoT threshold for the femto node based at least in part on a difference between the first pathloss and the second pathloss and a maximum interference level at the macrocell base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
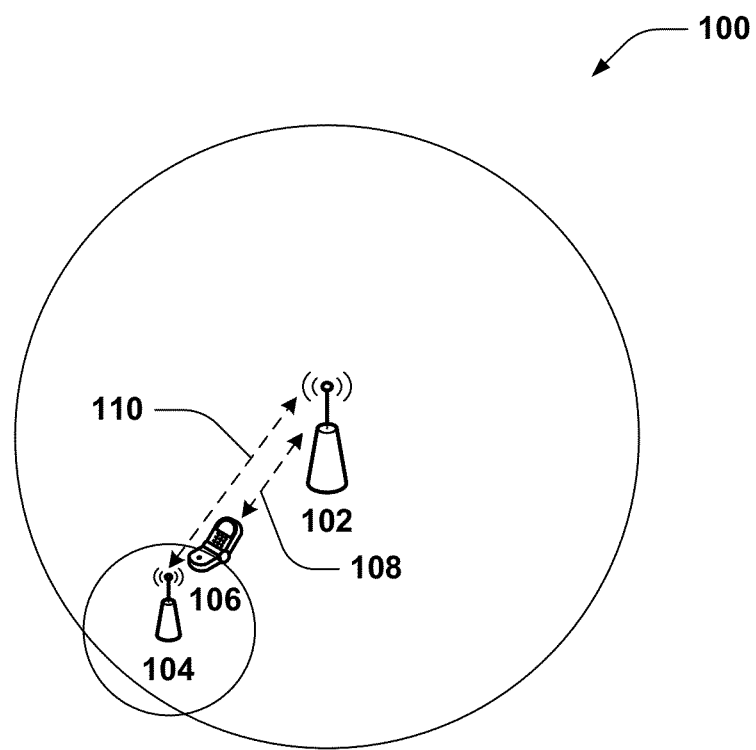
FIG. 1 is a block diagram of an aspect of a system for adaptively configuring a rise-over-thermal (RoT) threshold.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described further herein are various considerations related to adaptively configuring a rise-over-thermal (RoT) threshold for a low power base station. A low power base station can be referred to herein as a femto node, pico node, micro node, or similar base station, though it is to be appreciated that the aspects described herein can be applicable to substantially any low power base station. A femto node, for example, can determine an appropriate RoT threshold to improve device throughput without causing undue interference to another base station. For example, the femto node can compute a RoT threshold that does not cause devices to exceed a maximum interference level at the other base station. This can include computing a RoT for a potential worst-case device to not exceed a noise floor at the other base station based at least in part on a coverage area of the femto node and a measured pathloss from the femto node to the other base station. In another example, the RoT can similarly be computed based in part on determining pathloss difference between the femto node and the other base station based on actual device measurement reports over a period of time. In either case, the RoT threshold can be set to improve device communications while considering interference potentially caused to one or more other base stations.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an example system 100 for configuring a RoT threshold to mitigate interference to one or more base stations. System 100 can be a heterogeneously-deployed wireless network including base station 102, which can be a macrocell base station or similar base station (e.g., eNB) in a first power class, and base station 104, which can be a low power base station such as a femto node, pico node, micro node, etc., in a second power class that is lower than the first power class. The network can further include a device 106 that communicates with base stations 102 and/or 104. Device 106 can be a UE, a modem (or other tethered device), a portion thereof, and/or the like. In addition, base stations 102 and 104 can each be a macro node, femto node, pico node, micro node, or similar base station, a mobile base station, a relay station, a device (e.g., communicating in peer-to-peer or ad-hoc mode with device 106), a portion thereof and/or the like.

Device 106 can communicate with base station 104 to receive access to a wireless network. For example, device 106 can communicate with base station 104 though a signal strength of base station 102 may be higher than that of base station 104 and/or pathloss to the base station 102 may be less. In this example, base station 104 can be a femto node that provides device 106 with additional incentives, such as additional services, increased bandwidth, etc. To allow the device 106 to communicate with base station 104, base station 104 can operate using a RoT threshold that provides for receiving communications from device 106 in the face of possible interference from base station 102. Described herein are mechanisms for adaptively setting the RoT threshold at base station 104 to improve device 106 communications without causing undue interference to base station 102.

According to an example, base station 104 can configure a RoT threshold based in part on a maximum interference level allowed at base station 102. This can correspond to a noise floor and can be received from the base station 102 or other network component, estimated based on a noise floor of base station 104, and/or the like. In addition, the base station 104 can determine a pathloss, such as pathloss 108, to base station 102 of one or more devices, such as device 106, and/or a potential worst-case device communicating with base station 104. In one example, base station 104 can compute pathloss of a potential worst-case device as a measured pathloss 110 from base station 104 to base station 102 along with a coverage area of base station 104 applied to the pathloss, since a worst-case device can communicate at the cell-edge of the base station 104.

In another example, base station 104 can obtain measurement reports from device 106 and/or one or more other devices over a period of time, and can compute a pathloss difference between a reported pathloss to base station 104 and a reported pathloss 108 to base station 102. For example, base station 104 can utilize a lowest reported difference, an average of at least a portion of differences, and/or the like in a pathloss measurement to determine a RoT threshold for base station 104 to mitigate interference to base station 102.

In yet another example, base station 104 can implement reverse link attenuation to reduce a need for a higher RoT threshold where out-of-cell interference above a threshold is detected. This can prevent device 106 and/or other devices communicating with base station 104 from transmitting at higher transmit powers than needed. For example, devices communicating with base station 102 while within the coverage area of base station 104 can cause rise in thermal noise at the base station 104, which can cause RoT at the base station 104 to exceed the threshold. For example, base station 104 can implement restricted association such that the devices are not allowed to access base station 104 (referred to as non-member devices, for example). Thus these devices communicating with base station 102 cannot perform handover to base station 104 and can cause substantial interference to base station 104 and devices communicating therewith (e.g., device 106). Once the RoT exceeds the RoT threshold at base station 104, devices communicating with base station 104, such as device 106, can reduce power and/or data rate to help reduce the RoT, which may not be desirable in this case. Applying reverse link attenuation allows base station 104 to desensitize the interference caused by non-member devices. This also results in lowering RoT and allows devices communicating with base station 104 to increase transmission rate/power in view of the added room between the lowered RoT and the RoT threshold to overcome the interference.

In an example, reverse link attenuation can be used in conjunction with an adaptive RoT threshold. For example, once base station 104 determines a RoT threshold, base station 104 can map the RoT threshold to a maximum allowed attenuation level for the reverse link. In this example, when base station 104 determines to apply reverse link attenuation, base station 104 can compute the adapted RoT threshold based in part on a difference between a previous RoT threshold and the maximum attenuation level.

Figure 2:
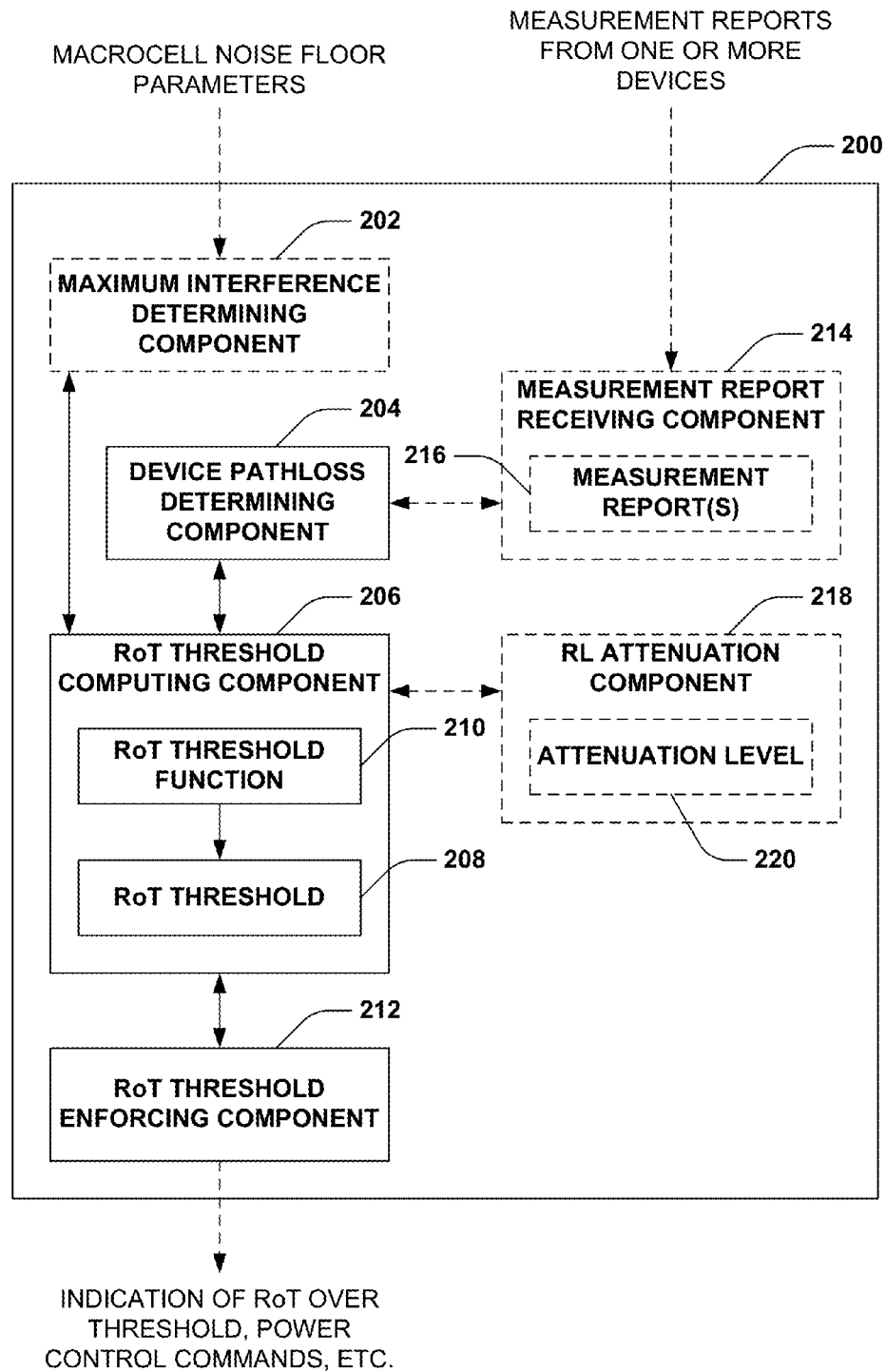
FIG. 2 is a block diagram of an aspect of a system for computing a RoT threshold.

FIG. 2 illustrates an example apparatus 200 for configuring a RoT threshold to mitigate interference with one or more base stations. Apparatus 200 can be a base station, such as a femto node or other low power base station, as described, that provides network access to one or more devices.

Apparatus 200 can comprise an optional maximum interference determining component 202 for obtaining or otherwise determining a maximum interference level related to a macrocell base station, a device pathloss determining component 204 for obtaining or otherwise estimating a pathloss to the macrocell base station, a RoT threshold computing component 206 for determining a RoT threshold 208 based at least in part on a RoT threshold function 210 of the the pathloss, and/or a RoT threshold enforcing component 212 for ensuring communications with apparatus 200 do not exceed a RoT threshold (e.g., by notifying devices of an exceeded RoT threshold, issuing power-down commands to the devices, and/or the like). Apparatus 200 can optionally comprise a measurement report receiving component 214 for obtaining one or more measurement reports 216 from one or more devices, and/or a reverse link (RL) attenuation component 218 for attenuating signals received over a reverse link to desensitize detected out-of-cell interference according to an attenuation level 220.

According to an example, maximum interference determining component 202 can obtain an indication of a maximum interference level at a macrocell base station. For example, noise floor parameters can be received from the macrocell base station, from a wireless network component, from a device communicating with the macrocell base station, and/or the like. In another example, maximum interference determining component 202 can determine the noise floor of the macrocell base station based on a noise floor of the apparatus 200. In one example, this can include computing the noise floor by subtracting one or more configurable or otherwise received values from the noise floor of apparatus 200. Maximum interference determining component 202, in any case, can provide the noise floor parameters to the RoT threshold computing component 206. In yet another example, the RoT threshold computing component 206 can assume or otherwise be hardcoded with a maximum interference level for computing the RoT threshold.

In addition, for example, device pathloss determining component 204 can obtain a pathloss of one or more actual devices, a potential worst-case device, and/or the like to the macrocell base station. In one example, device pathloss determining component 204 can measure a pathloss of the apparatus 200 to the macrocell base station and can modify the measured pathloss by a coverage area of the apparatus 200 to emulate pathloss of a worst-case device at the edge of the coverage area to the macrocell base station. For example, this can include measuring the pathloss based on pilot signals received from the macrocell base station.

In another example, measurement report receiving component 214 can obtain measurement report(s) 216 from one or more devices (e.g., as part of a handover procedure, in response to measurement request sent by the femto node or otherwise) and can compute a difference between pathloss measurements to the macrocell base station and to the apparatus 200 as reported in one or more measurement reports 216. In this example, device pathloss determining component 204 can obtain the pathloss based on one or more of the computed differences (e.g., a lowest difference, an average difference, a percentile difference, such as 5%, etc. based in part on at least a subset of the differences). In any case, device pathloss determining component 204 can provide the pathloss to RoT threshold computing component 206.

In this regard, RoT threshold computing component 206 can obtain the pathloss and/or maximum interference level, and can compute a RoT threshold 208 based on the parameters. For example, the parameters can be provided to a RoT threshold function 210 to produce a resulting RoT threshold 208. The RoT threshold function 210 can compute the RoT threshold 208 such to improve device communication with apparatus 200 while mitigating interference to one or more macrocell base stations based on the maximum interference level. RoT threshold computing component 206 can provide the RoT threshold to RoT threshold enforcing component 212, which can attempt to ensure the RoT threshold is not exceeded at least in part by providing indications of RoT level relative to the RoT threshold, communicating commands to to one or more devices to directly lower uplink data rate or other commands that result in the devices to lower uplink data rate and power, and/or the like.

For example, RL transmit pilot power of a device, denoted by P, can be a function of a pilot signal quality ($Ecp/Io_f$) that enables communication and the amount of RoT ($Io_f/No_f$) present at the femto node. Io and No can denote the total received signal strength indicator (RSSI) and the noise floor, respectively. The subscript f indicates that these measurements are obtained at the femto node.

$$P = (Ecp - Io_f) + Io_f + PL_f$$

$$P = (Ecp - Io_f) + (RoT_f + No_f) + PL_f$$

$PL_f$ is the path loss from the device to apparatus 200, which can be a serving femto node. As described, RoT threshold computing component 206 can compute the RoT threshold 208 such to limit the received interference received from a pilot signal for the device communicating with the apparatus 200, at the macrocell base station, to be a certain level (e.g., 20 decibel (dB)) below the noise floor of the macrocell base station. Thus, for example, the RoT threshold 208 can be a function of at least the noise floor of the macrocell base station, $No_m$, determined by the maximum interference determining component 202 or otherwise set as one or more hard-coded or configured parameters in the wireless network. In this regard, even in the presence of a large number of devices communicating with apparatus 200, the aggregate interference caused to the macrocell base station can be relatively low. For example, this constraint can be as shown below, where $PL_m$ is the pathloss from the device to the nearest macrocell base station.

$$P - PL_m \leq No_m - 20$$

Substituting for P, this constraint can be rewritten as:

$$(Ecp - Io_f) + (RoT_f + No_f) + PL_f - PL_m \leq No_m - 20$$

Reorganizing terms, the apparatus 200 (also referred to in this description as the femto node) RoT can be less than the expression below.

$$RoT_f \leq (PL_m - PL_f) - (Ecp - Io_f) - (No_f - No_m) - 20$$

RoT threshold function 210 can utilize this formula or a similar formula, in one example, to compute RoT threshold 208, where 20 dB is the desired limited interference below the noise floor at the macrocell base station, and can be adjusted based on balancing improving device communications with instances of exceeding the noise floor at the macrocell base station.

Moreover in specific examples, the device pathloss determining component 204 can estimate $PL_m$ from a device (e.g., a worst-case device) to the macrocell base station, which in one example can be obtained using measurements of a macrocell base station from a network listening module (NLM), or similar module related to device pathloss determining component 204 for receiving signals in a wireless network, denoted by $Ec_m$. These can be pilot signals received from the macrocell base station, in one example. In another example, as described, device pathloss determining component 204 can otherwise receive $PL_m$ based at least in part on a measurement report 216 from the device. Moreover, for example, to account for worse case RF mismatch between the device pathloss measurement and a measurement from the apparatus 200, $PL_m$ can be assumed to be 10 dB less than the estimate of device pathloss determining component 204. For example, the 10 dB mismatch can also relate to the coverage area of the apparatus 200. Macrocell base station transmit power can be 43 dB. Thus, RoT threshold computing component 206 can utilize the following formulas, or similar formulas, in the RoT threshold function 210 to compute the RoT threshold 208, in one example:

$$RoT_f \leq (43 - Ec_M - 10 - PL_f) - (Ecp - Io_f) - (No_f - No_m) - 20$$

$$RoT_f \leq Ec_M - PL_f + 13 - (Ecp - Io_f) - (No_f - No_m)$$

In further specific examples, it can be assumed that the noise floor of the femto node (e.g., apparatus 200) is 9 dB higher than the noise floor of the macrocell base station (e.g., to reduce design complexity). In addition, it can be assumed that a potential worst-case device is assumed to be located at the femto node cell-edge (e.g., assumed to be 90 dB away). Note that not all devices may be located at the edge; therefore the impact from other devices may not be as much as the potential worst-case device. Femto node locations and power levels can then be chosen to ensure that most of the desired coverage is within 85 dB pathloss from the femto node. With dual receive diversity at the femto node, devices can maintain approximately −23 dB Ecp/Nt (pilot chip energy to interference ratio), which is approximately equal to the required Ecp/Io$_f$. Substituting these into the equation, RoT threshold computing component 206 can alternatively use a formula similar to the following in the RoT threshold function 210 for computing RoT threshold 208:

$$RoT_f \leq -Ec_M - 63$$

Thus, in this example, the device pathloss determining component 204 can determine measurements of pilot signals from the macrocell base station, and actual noise floor information is not required (e.g., this information is assumed as described). In addition, in any case, RoT threshold computing component 206 can impose an absolute minimum (e.g., 5 dB) and/or an absolute maximum (e.g., 40 dB) on the RoT threshold 208.

In yet another example, RL attenuation component 218 can apply an attenuation level 220 to incoming signals to desensitize interference thereover, and RoT threshold computing component 206 can further generate the RoT threshold 208 for apparatus 200 based on the attenuation level 220. Upon detecting out-of-cell interference from one or more devices communicating with the macrocell base station to be over a threshold, RL attenuation component 218 can begin applying the attenuation level 220 to lessen the impact of the interference. For example, the attenuation level 220 can be stepped up or down according to a step size (e.g., 5 dB) depending on a maximum level of allowed attenuation and a level of the out-of-cell interference. RL attenuation component 218, in an example, can dynamically step-up or step-down the attenuation level 220 based on a current level of out-of-cell interference. In the presence of large bursty interference, for example, RL attenuation component 218 applies the attenuation level 220 with the first burst, and the level can be mostly retained when a second burst arrives. In this regard, the second burst may not create a large increase in the RoT.

Thus, using RL attenuation can provide improved RoT control and can limit fluctuation in device signal-to-interference-and-noise ratio (SINR) levels since the devices have already adapted transmit power to the attenuation level 220. On the other hand, the stepping-up and down of the attenuation level 220 can occur in certain time periods, and thus devices may transmit at higher power levels for a certain durations. In an example, the adaptive RL attenuation can be used in conjunction with the adaptive RoT threshold described above. For example, upon RoT threshold computing component 206 computing the RoT threshold 208, RoT threshold computing component 206 can map the RoT threshold 208 to a maximum allowed attenuation level 220. For example, $$Max_{Attenuation} = max(0, \lfloor (RoT\text{Threshold} - 16)/5 \rfloor)*5$$

where the step-size described above is 5 dB. RoT threshold computing component 206 can then adjust the RoT threshold to implement the attenuation as the difference between the original threshold and the maximum computed attenuation level. This can limit the effective RoT threshold to within 20 dB; however, it is to be appreciated that the parameters can be modified to yield a different maximum RoT threshold value.

Figure 3:
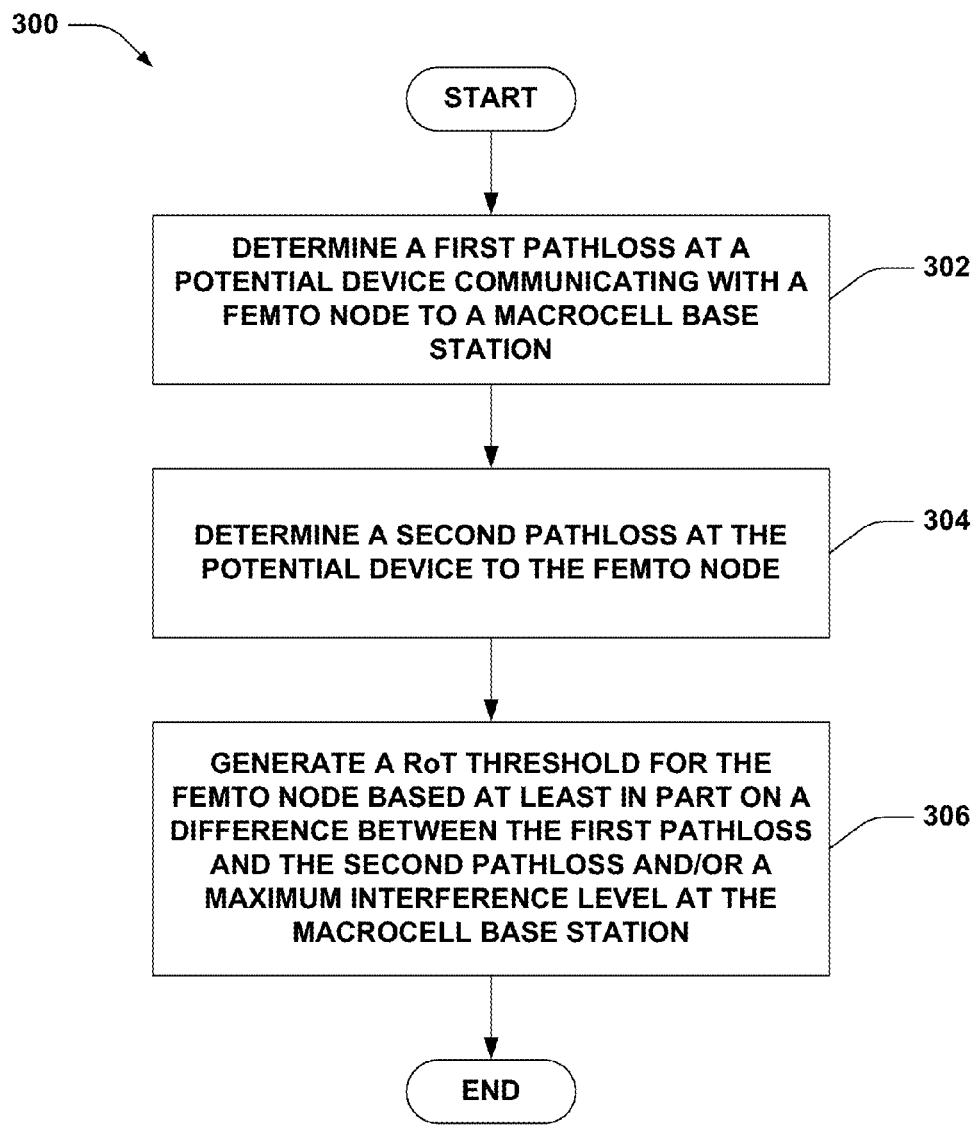
FIG. 3 is a flow chart of an aspect of a methodology for generating a RoT threshold for a femto node.
Figure 4:
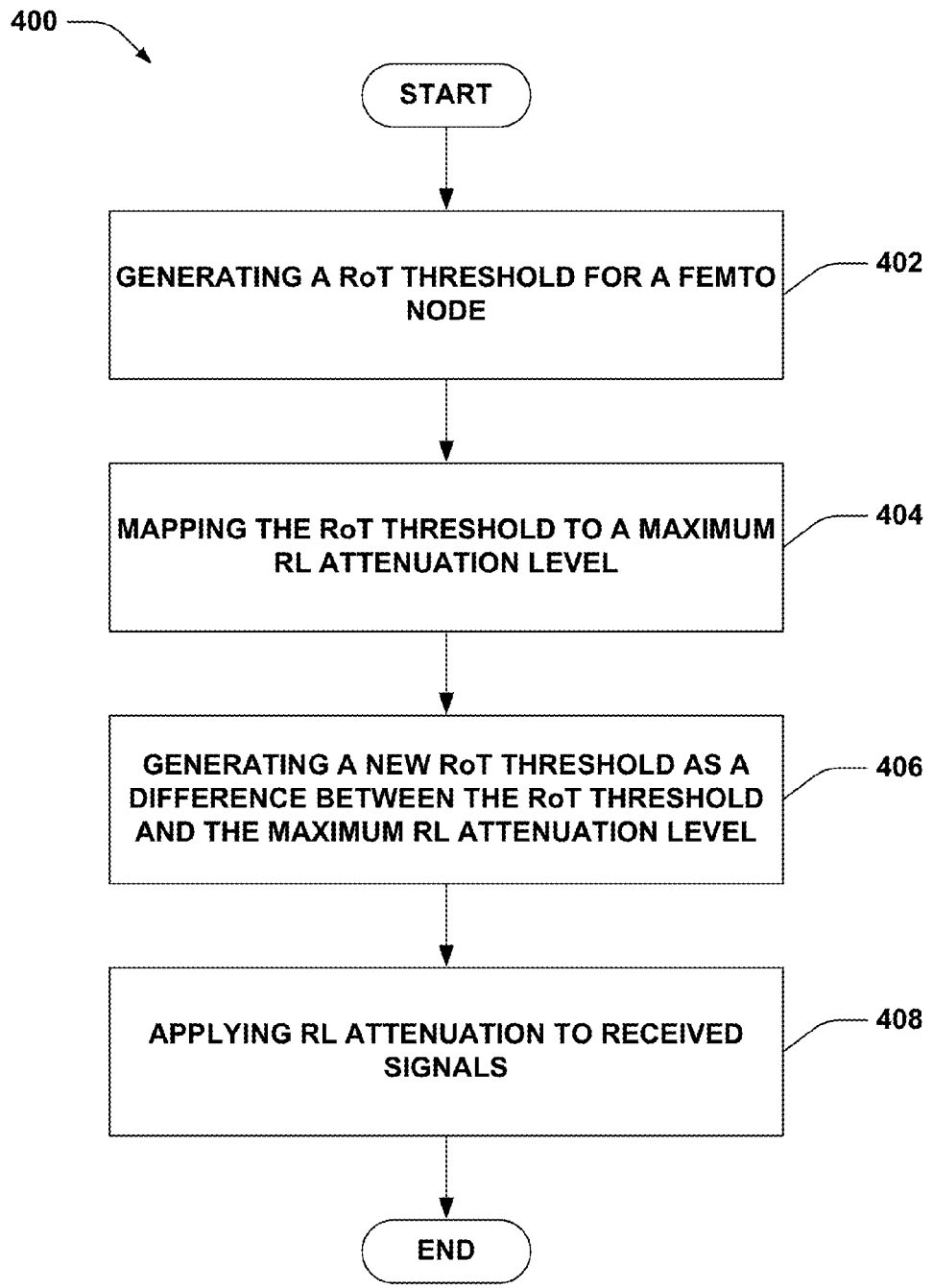
FIG. 4 is a flow chart of an aspect of a methodology for generating a RoT threshold based on a reverse link attenuation level.

FIGS. 3-4 illustrate example methodologies relating to computing RoT thresholds. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 3 depicts an example methodology 300 for generating a RoT threshold. At 302, a pathloss at a potential device communicating with a femto node can be determined to a macrocell base station. The pathloss can be determined based on a measured pathloss from the femto node to the macrocell base station with a coverage area or RF mismatched value applied. In another example, the pathloss can be determined based one or more pathlosses or pathloss differences between the femto node and macrocell base station as reported in measurement reports received from one or more actual devices (e.g., based on a lowest pathloss difference, an average pathloss difference, and/or the like).

At 304, a second pathloss to the femto node can be determined at the potential device. For example, this can include determining a coverage area of the femto node in assuming an RF mismatch for a worst case device, otherwise receiving pathloss measurements from the one or more actual devices, and/or the like.

At 306, a RoT threshold for the femto node can be generated based at least in part on a difference between the pathloss and the second pathloss and/or a maximum interference level at the macrocell base station. In an example, this can include generating the RoT threshold to improve device communications while mitigating interference to the macrocell base station. As described, the RoT threshold can be computed as a function of the pathloss and/or the maximum interference level. Moreover, the RoT threshold can be computed based on an absolute maximum or absolute minimum RoT threshold at the femto node. In addition, the RoT threshold can be enforced through indications of a RoT relative to the RoT threshold, communicating commands to adjust power or transmission rate based on the RoT relative to the RoT threshold, etc.

FIG. 4 illustrates an example methodology 400 for generating a RoT threshold. At 402, a RoT threshold can be generated for a femto node. As described, this can be based on a pathloss difference between the femto node and a macrocell base station, a maximum interference level of the macrocell base station, and/or the like. At 404, the RoT threshold can be mapped to a maximum RL attenuation level. For example, this can be based on a formula to compute a maximum allowed RL attenuation level based on the RoT threshold (e.g., $\text{Max}_{Attenuation} = \max(0, \lfloor (\text{RoTThreshold} - 16)/5 \rfloor * 5)$).

At 406, a new RoT threshold can be generated as a difference between the RoT threshold and the maximum RL attenuation level. At 408, RL attenuation can be applied to received signals. For example, the RL attenuation can be applied to signals received from devices communicating with the macrocell base station to desensitize the interference. This can include lowering a level of received energy through attenuation, and thus lowering RoT, which can allow devices communicating with the femto node to increase transmission rate given that the RoT threshold has not been exceeded.

It will be appreciated that, in accordance with one or more aspects described herein, inferences can be made regarding determining a pathloss, a maximum interference level, an attenuation level, and/or other parameters for determining a RoT threshold, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 5:
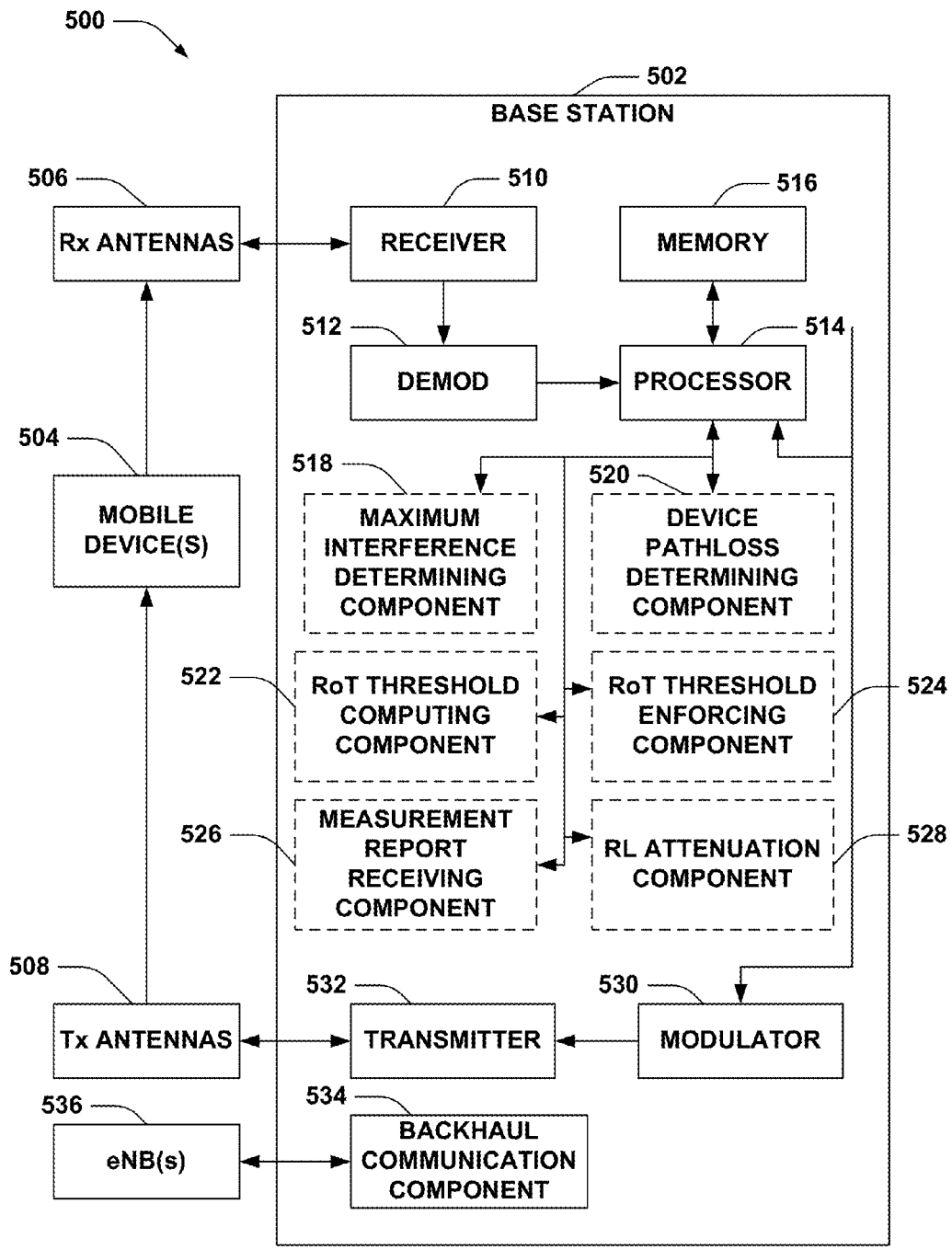
FIG. 5 is a block diagram of a system in accordance with aspects described herein.

FIG. 5 is an illustration of a system 500 that facilitates adaptively configuring a RoT threshold. System 500 includes a base station 502 having a receiver 510 that receives signal(s) from one or more mobile devices 504 through a plurality of receive antennas 506 (e.g., which can be of multiple network technologies, as described), and a transmitter 532 that transmits to the one or more mobile devices 504 through a plurality of transmit antennas 508 (e.g., which can be of multiple network technologies, as described). Receiver 510 can receive information from one or more receive antennas 506 and is operatively associated with a demodulator 512 that demodulates received information. Though depicted as separate antennas, it is to be appreciated that at least one of receive antennas 506 and a corresponding one of transmit antennas 508 can be combined as the same antenna. Demodulated symbols are analyzed by a processor 514, which is coupled to a memory 516 that stores information related to performing one or more aspects described herein.

Processor 514, for example, can be a processor dedicated to analyzing information received by receiver 510 and/or generating information for transmission by a transmitter 532, a processor that controls one or more components or modules of base station 502, and/or a processor that analyzes information received by receiver 510, generates information for transmission by transmitter 532, and controls one or more components or modules of base station 502. In addition, processor 514 can perform one or more functions described herein and/or can communicate with components or modules for such a purpose.

Memory 516, as described, is operatively coupled to processor 514 and can store data to be transmitted, received data, information related to available channels, data associated with analyzed signal and/or interference strength, information related to an assigned channel, power, rate, or the like, and any other suitable information for estimating a channel and communicating via the channel. Memory 516 can additionally store protocols, instructions for execution by processor 514, algorithms, etc. associated with aspects described herein, such as generating a RoT threshold.

It will be appreciated that the data store (e.g., memory 516) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 516 of the subject systems and methods is intended to comprise, without being limited to, these and any other suitable types of memory.

Processor 514 is further optionally coupled to maximum interference determining component 518, which can be similar to maximum interference determining component 202, a device pathloss determining component 520, which can be similar to device pathloss determining component 204, a RoT threshold computing component 522, which can be similar to RoT threshold computing component 206, a RoT threshold enforcing component 524, which can be similar to RoT threshold enforcing component 212, a measurement report receiving component 526, which can be similar to measurement report receiving component 214, and/or a RL attenuation component 528, which can be similar to RL attenuation component 218.

Moreover, for example, processor 514 can modulate signals to be transmitted using modulator 530, and transmit modulated signals using transmitter 532. Transmitter 532 can transmit signals to mobile devices 504 over Tx antennas 508. In addition, base station 502 can include a backhaul communication component 534 for communicating with one or more eNBs 536 over a backhaul interface. For example, backhaul communication component 534 can communicate with the eNBs 536 over a wired or wireless backhaul link using one or more backhaul interfaces (e.g., X2 interface in LTE). Where the backhaul link is wireless for example, it is to be appreciated that base station 502 can utilize Rx antennas 506 and receiver 510 to receive communications from eNBs 536, and/or Tx antennas 508 and transmitter 532 to communicate signals to eNBs 536.

Furthermore, although depicted as being separate from the processor 514, it is to be appreciated that the maximum interference determining component 518, device pathloss determining component 520, RoT threshold computing component 522, RoT threshold enforcing component 524, measurement report receiving component 526, RL attenuation component 528, backhaul communication component 534, demodulator 512, and/or modulator 530 can be part of the processor 514 or multiple processors (not shown), and/or stored as instructions in memory 516 for execution by processor 514.

Figure 6:
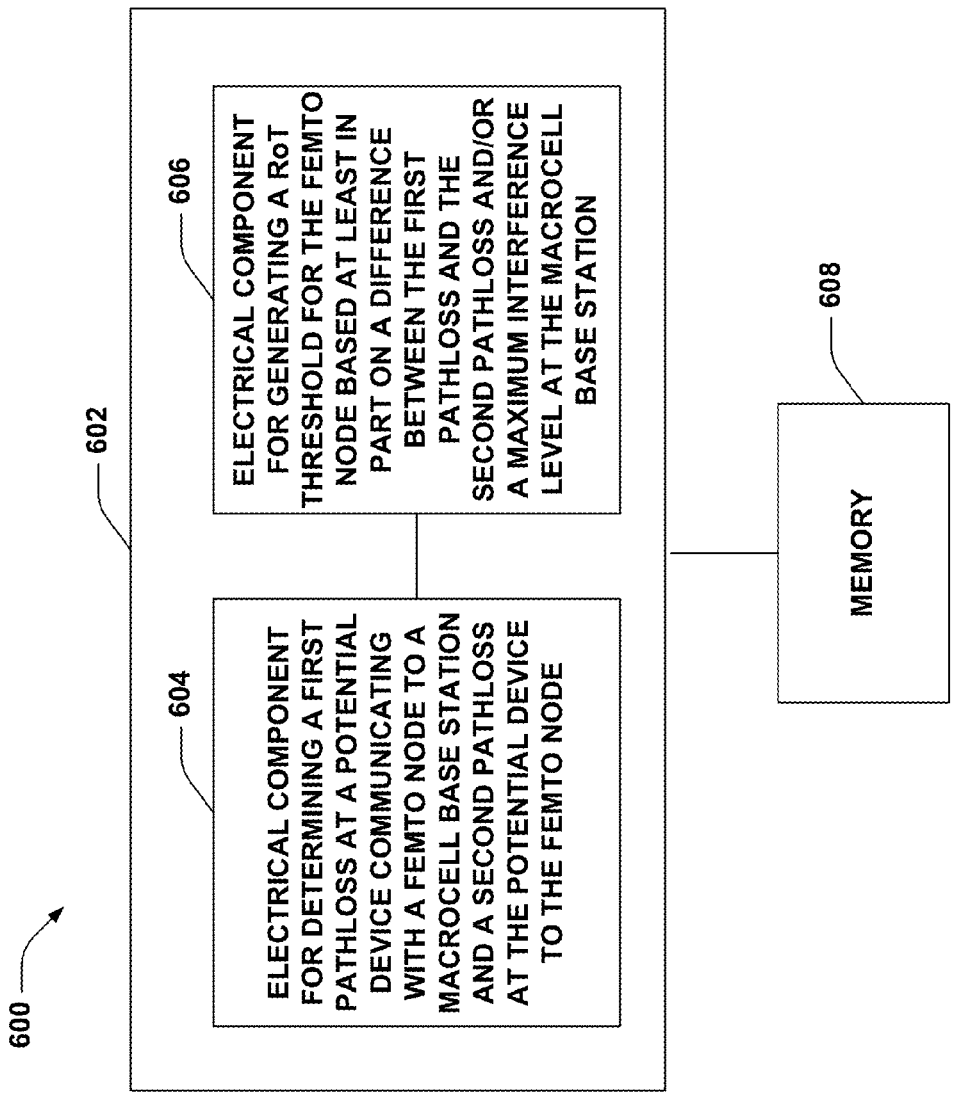
FIG. 6 is a block diagram of an aspect of a system for generating a RoT threshold.

FIG. 6 illustrates a system 600 for generating a RoT threshold. For example, system 600 can reside at least partially within a femto node or other base station. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include an electrical component for determining a first pathloss at a potential device communicating with a femto node to a macrocell base station and a second pathloss at the potential device to the femto node 604. As described, the first pathloss can be determined based on a measured pathloss to the macrocell from the system 600 (e.g., using an NLM, not shown), based on a measurement report received from one or more devices, and/or the like, and the second pathloss can be determined based on a coverage area of the femto node, a measurement report from the one or more devices, etc.

Further, logical grouping 602 can comprise an electrical component for generating a RoT threshold for the femto node based at least in part on a difference between the first pathloss and the second pathloss and/or a maximum interference level at the macrocell base station 606. For example, the RoT threshold can be set such to improve device communications while mitigating interference to a macrocell base station. For example, electrical component 604 can include a device pathloss determining component 204, as described above. In addition, for example, electrical component 606, in an aspect, can include a RoT threshold computing component 206, as described above.

Additionally, system 600 can include a memory 608 that retains instructions for executing functions associated with the electrical components 604 and 606. While shown as being external to memory 608, it is to be understood that one or more of the electrical components 604 and 606 can exist within memory 608. In one example, electrical components 604 and 606 can comprise at least one processor, or each electrical component 604 and 606 can be a corresponding module of at least one processor. Moreover, in an additional or alternative example, electrical components 604 and 606 can be a computer program product comprising a computer readable medium, where each electrical component 604 and 606 can be corresponding code.

Figure 7:
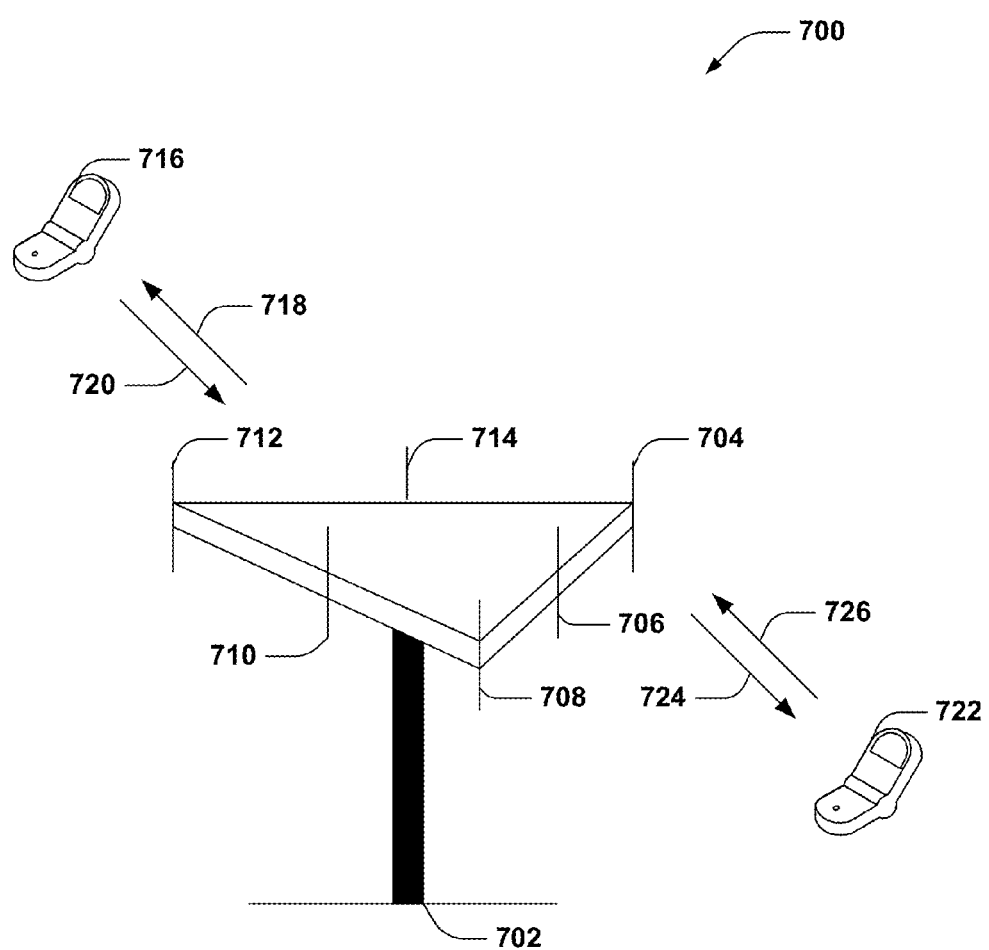
FIG. 7 is a block diagram of an aspect of a wireless communication system in accordance with various aspects set forth herein.

FIG. 7 illustrates a wireless communication system 700 in accordance with various embodiments presented herein. System 700 comprises a base station 702 that can include multiple antenna groups. For example, one antenna group can include antennas 704 and 706, another group can comprise antennas 708 and 710, and an additional group can include antennas 712 and 714. Two antennas are illustrated for each antenna group; however, more or fewer antennas can be utilized for each group. Base station 702 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 702 can communicate with one or more mobile devices such as mobile device 716 and mobile device 722; however, it is to be appreciated that base station 702 can communicate with substantially any number of mobile devices similar to mobile devices 716 and 722. Mobile devices 716 and 722 can be, for example, cellular phones, smart phones, laptops, handheld communication devices, handheld computing devices, satellite radios, global positioning systems, PDAs, and/or any other suitable device for communicating over wireless communication system 700. As depicted, mobile device 716 is in communication with antennas 712 and 714, where antennas 712 and 714 transmit information to mobile device 716 over a forward link 718 and receive information from mobile device 716 over a reverse link 720. Moreover, mobile device 722 is in communication with antennas 704 and 706, where antennas 704 and 706 transmit information to mobile device 722 over a forward link 724 and receive information from mobile device 722 over a reverse link 726. In a frequency division duplex (FDD) system, forward link 718 can utilize a different frequency band than that used by reverse link 720, and forward link 724 can employ a different frequency band than that employed by reverse link 726, for example. Further, in a time division duplex (TDD) system, forward link 718 and reverse link 720 can utilize a common frequency band and forward link 724 and reverse link 726 can utilize a common frequency band.

Each group of antennas and/or the area in which they are designated to communicate can be referred to as a sector of base station 702. For example, antenna groups can be designed to communicate to mobile devices in a sector of the areas covered by base station 702. In communication over forward links 718 and 724, the transmitting antennas of base station 702 can utilize beamforming to improve signal-to-noise ratio of forward links 718 and 724 for mobile devices 716 and 722. Also, while base station 702 utilizes beamforming to transmit to mobile devices 716 and 722 scattered randomly through an associated coverage, mobile devices in neighboring cells can be subject to less interference as compared to a base station transmitting through a single antenna to all its mobile devices. Moreover, mobile devices 716 and 722 can communicate directly with one another using a peer-to-peer or ad hoc technology as depicted. According to an example, system 700 can be a multiple-input multiple-output (MIMO) communication system or similar system that allows assigning multiple carriers between base station 702 and mobile devices 716 and/or 722.

Figure 8:
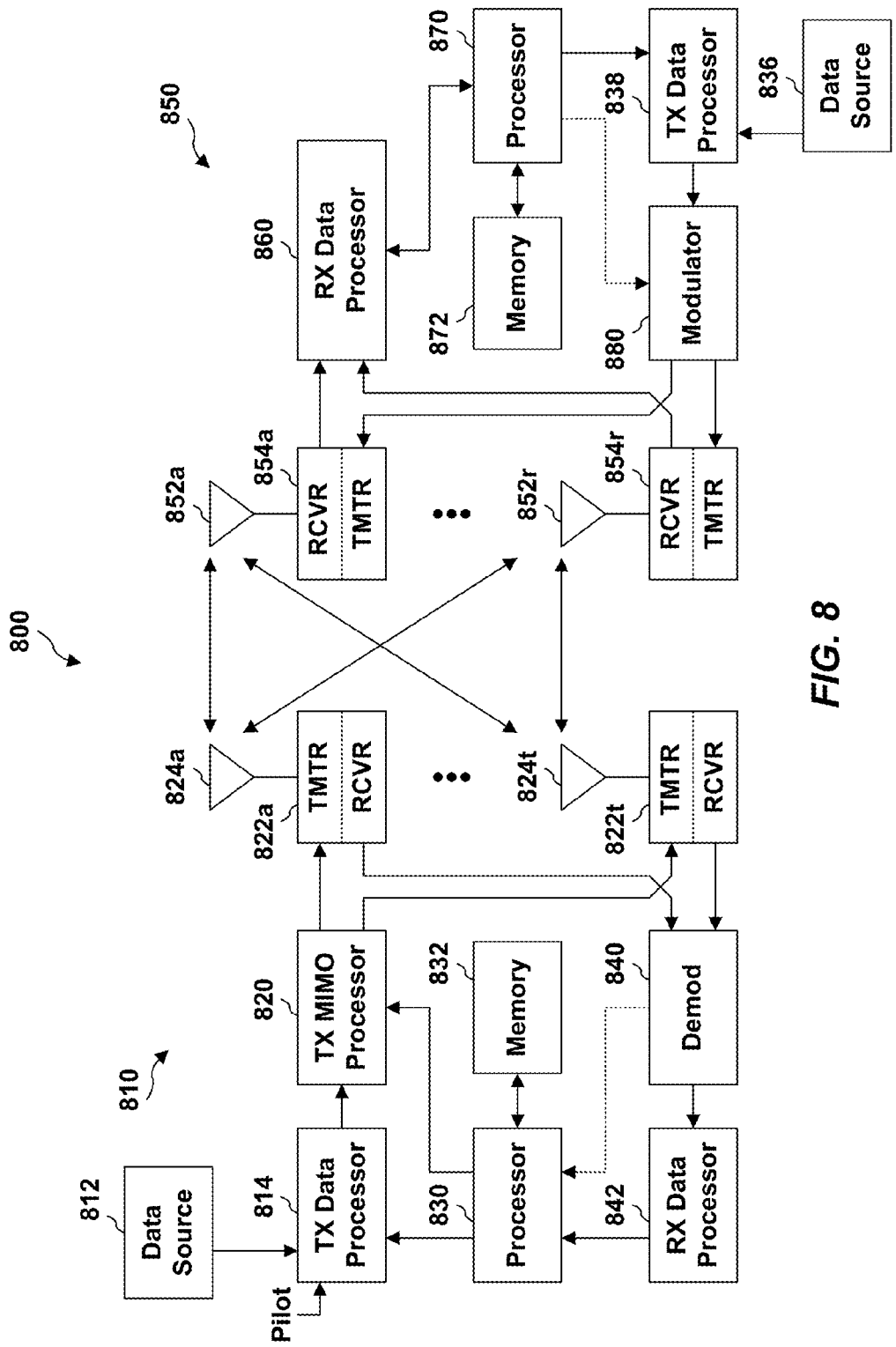
FIG. 8 is a schematic block diagram of an aspect of a wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-2 and 5-7) and/or methods (FIGS. 3-4) described herein to facilitate wireless communication there between. For example, components or functions of the systems and/or methods described herein can be part of a memory 832 and/or 872 or processors 830 and/or 870 described below, and/or can be executed by processors 830 and/or 870 to perform the disclosed functions.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. For example, processor 830 and/or 870 can execute, and/or memory 832 and/or 872 can store instructions related to functions and/or components described herein, such as computing a RoT threshold, determining a potential device pathloss, obtaining a maximum interference level at a macrocell base station, and/or the like, as described.

Figure 9:
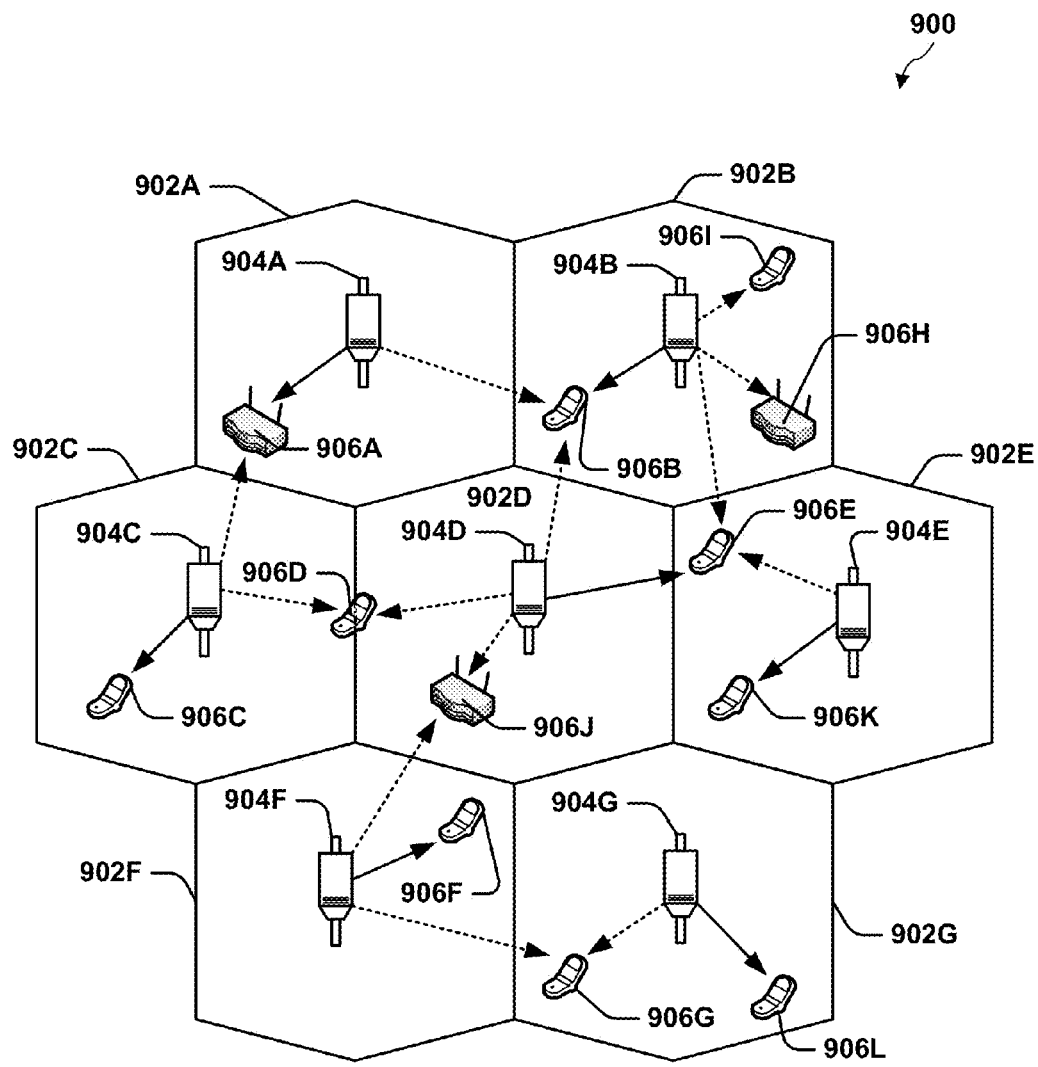
FIG. 9 illustrates an example wireless communication system, configured to support a number of devices, in which the aspects herein can be implemented.

FIG. 9 illustrates a wireless communication system 900, configured to support a number of users, in which the teachings herein may be implemented. The system 900 provides communication for multiple cells 902, such as, for example, macro cells 902A-902G, with each cell being serviced by a corresponding access node 904 (e.g., access nodes 904A-904G). As shown in FIG. 9, access terminals 906 (e.g., access terminals 906A-906L) can be dispersed at various locations throughout the system over time. Each access terminal 906 can communicate with one or more access nodes 904 on a forward link (FL) and/or a reverse link (RL) at a given moment, depending upon whether the access terminal 906 is active and whether it is in soft handoff, for example. The wireless communication system 900 can provide service over a large geographic region.

Figure 10:
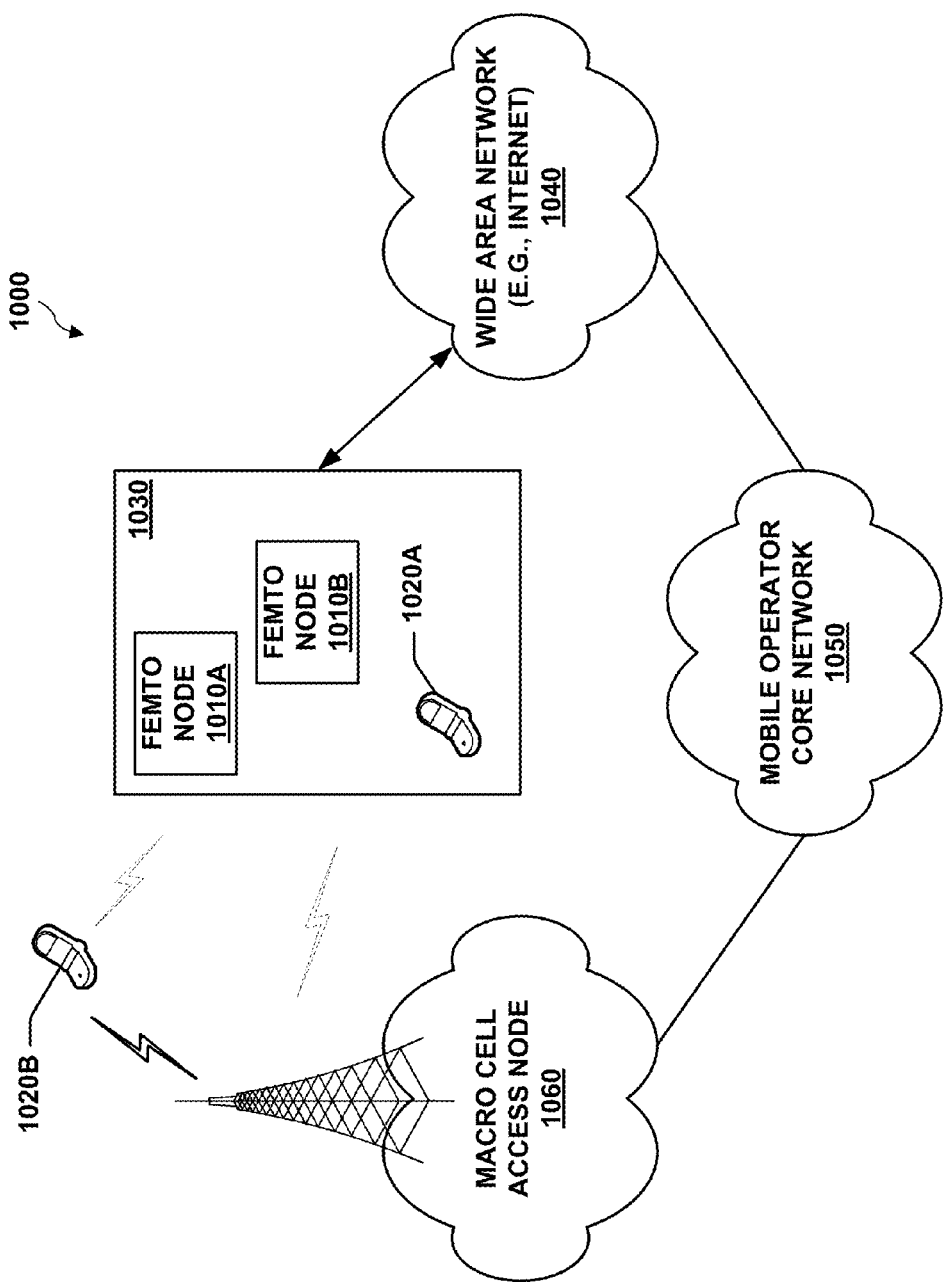
FIG. 10 is an illustration of an exemplary communication system to enable deployment of femtocells within a network environment.

FIG. 10 illustrates an exemplary communication system 1000 where one or more femto nodes are deployed within a network environment. Specifically, the system 1000 includes multiple femto nodes 1010A and 1010B (e.g., femtocell nodes or H(e)NB) installed in a relatively small scale network environment (e.g., in one or more user residences 1030). Each femto node 1010 can be coupled to a wide area network 1040 (e.g., the Internet) and a mobile operator core network 1050 via a digital subscriber line (DSL) router, a cable modem, a wireless link, or other connectivity means (not shown). As will be discussed below, each femto node 1010 can be configured to serve associated access terminals 1020 (e.g., access terminal 1020A) and, optionally, alien access terminals 1020 (e.g., access terminal 1020B). In other words, access to femto nodes 1010 can be restricted such that a given access terminal 1020 can be served by a set of designated (e.g., home) femto node(s) 1010 but may not be served by any non-designated femto nodes 1010 (e.g., a neighbor's femto node).

Figure 11:
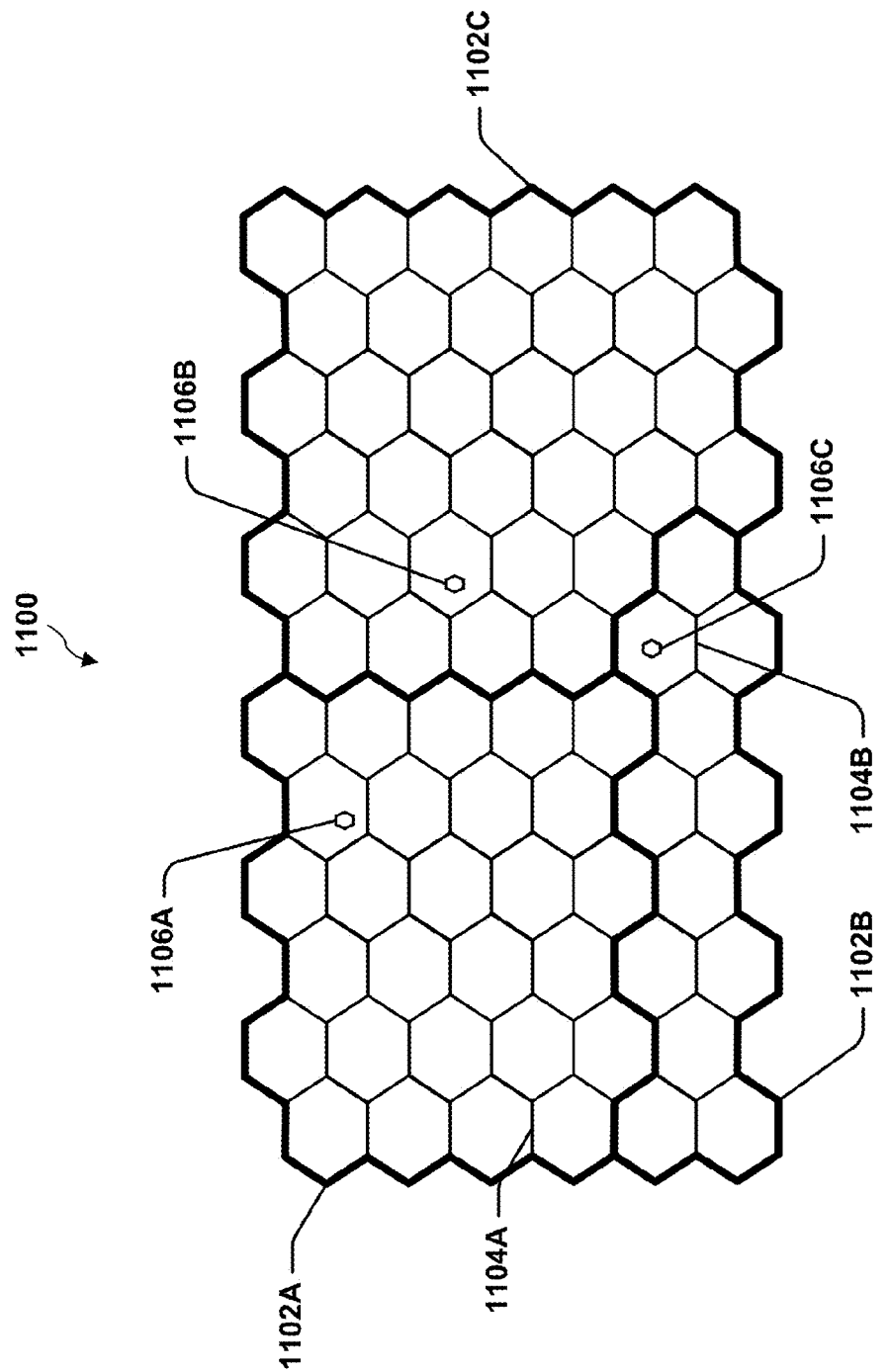
FIG. 11 illustrates an example of a coverage map having several defined tracking areas.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the hexagons. The tracking areas 1102 also include femto coverage areas 1106. In this example, each of the femto coverage areas 1106 (e.g., femto coverage area 1106C) is depicted within a macro coverage area 1104 (e.g., macro coverage area 1104B). It should be appreciated, however, that a femto coverage area 1106 may not lie entirely within a macro coverage area 1104. In practice, a large number of femto coverage areas 1106 can be defined with a given tracking area 1102 or macro coverage area 1104. Also, one or more pico coverage areas (not shown) can be defined within a given tracking area 1102 or macro coverage area 1104.

Referring again to FIG. 10, the owner of a femto node 1010 can subscribe to mobile service, such as, for example, 3G mobile service, offered through the mobile operator core network 1050. In addition, an access terminal 1020 can be capable of operating both in macro environments and in smaller scale (e.g., residential) network environments. Thus, for example, depending on the current location of the access terminal 1020, the access terminal 1020 can be served by an access node 1060 or by any one of a set of femto nodes 1010 (e.g., the femto nodes 1010A and 1010B that reside within a corresponding user residence 1030). For example, when a subscriber is outside his home, he is served by a standard macro cell access node (e.g., node 1060) and when the subscriber is at home, he is served by a femto node (e.g., node 1010A). Here, it should be appreciated that a femto node 1010 can be backward compatible with existing access terminals 1020.

A femto node 1010 can be deployed on a single frequency or, in the alternative, on multiple frequencies. Depending on the particular configuration, the single frequency or one or more of the multiple frequencies can overlap with one or more frequencies used by a macro cell access node (e.g., node 1060). In some aspects, an access terminal 1020 can be configured to connect to a preferred femto node (e.g., the home femto node of the access terminal 1020) whenever such connectivity is possible. For example, whenever the access terminal 1020 is within the user's residence 1030, it can communicate with the home femto node 1010.

In some aspects, if the access terminal 1020 operates within the mobile operator core network 1050 but is not residing on its most preferred network (e.g., as defined in a preferred roaming list), the access terminal 1020 can continue to search for the most preferred network (e.g., femto node 1010) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1020 can limit the search for specific band and channel. For example, the search for the most preferred system can be repeated periodically. Upon discovery of a preferred femto node, such as femto node 1010, the access terminal 1020 selects the femto node 1010 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1010 that reside within the corresponding user residence 1030). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on (e.g., the access terminal is a non-member), except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing uplink interference between devices communicating with a femto node and a macrocell base station, comprising:
   determining a first pathloss at a potential device communicating with a femto node to a macrocell base station;
   determining a second pathloss at the potential device to the femto node; and
   generating a rise-over-thermal (RoT) threshold for the femto node based at least in part on a difference between the first pathloss and the second pathloss and a maximum interference level at the macrocell base station.

2. The method of claim 1, wherein the determining the first pathloss comprises measuring a femto node pathloss from the femto node to the macrocell base station, and wherein the determining the second pathloss is based on a coverage area of the femto node.

3. The method of claim 1, further comprising measuring a femto node pathloss to the femto node, wherein the determining the second pathloss at the potential device to the femto node comprises applying a coverage area of the femto node.

4. The method of claim 1, further comprising receiving a measurement report from at least one mobile device comprising the second pathloss from the at least one mobile device to the femto node and the first pathloss from the at least one mobile device to the macrocell base station.

5. The method of claim 1, further comprising receiving one or more measurement reports from one or more mobile devices comprising a plurality of femto node pathlosses from the one or more mobile devices to the femto node and a plurality of macrocell pathlosses from the one or more mobile devices to the macrocell base station, wherein the determining the second pathloss is based on the plurality of femto node pathlosses, and the determining the first pathloss is based on the plurality of macrocell pathlosses.

6. The method of claim 1, further comprising determining the maximum interference level at the macrocell base station based in part on a difference in a first noise floor level of the macrocell base station and a second noise floor level of the femto node.

7. The method of claim 1, further comprising:
   determining a maximum reverse link (RL) attenuation level to be applied to an out-of-cell interference;
   mapping the RoT threshold to the maximum RL attenuation level; and
   generating a new RoT threshold as a difference between the RoT threshold and the maximum RL attenuation level.

8. The method of claim 1, wherein the generating the RoT threshold is based further on an absolute maximum RoT threshold or an absolute minimum RoT threshold.

9. The method of claim 1, further comprising indicating a current RoT relative to the RoT threshold to one or more devices.

10. The method of claim 1, further comprising communicating commands to one or more devices to adapt uplink data rates based in part on a current RoT relative to the RoT threshold.

11. An apparatus for managing uplink interference between devices communicating with a femto node and a macrocell base station, comprising:
   at least one processor configured to:
      determine a first pathloss at a potential device communicating with a femto node to a macrocell base station;
      determine a second pathloss at the potential device to the femto node; and generate a rise-over-thermal (RoT) threshold for the femto node based at least in part on a difference between the first pathloss and the second pathloss and a maximum interference level at the macrocell base station; and a memory coupled to the at least one processor.

12. The apparatus of claim 11, wherein the at least one processor determines the first pathloss based in part on measuring a femto node pathloss from the femto node to the macrocell base station, and the at least one processor determines the second pathloss based on a coverage area of the femto node.

13. The apparatus of claim 11, wherein the at least one processor is further configured to measure a femto node pathloss to the femto node, wherein the at least one processor determines the second pathloss at the potential device to the femto node in part by applying a coverage area of the femto node.

14. The apparatus of claim 11, wherein the at least one processor is further configured to receive a measurement report from at least one mobile device comprising the second pathloss from the at least one mobile device to the femto node and the first pathloss from the at least one mobile device to the macrocell base station.

15. An apparatus for managing uplink interference between devices communicating with a femto node and a macrocell base station, comprising:
means for determining a first pathloss at a potential device communicating with a femto node to a macrocell base station and determining a second pathloss at the potential device to the femto node; and
means for generating a rise-over-thermal (RoT) threshold for the femto node based at least in part on a difference between the first pathloss and the second pathloss and a maximum interference level at the macrocell base station.

16. The apparatus of claim 15, wherein the means for determining determines the first pathloss in part by measuring a femto node pathloss from the femto node to the macrocell base station, and the means for determining determines the second pathloss based on a coverage area of the femto node.

17. The apparatus of claim 15, wherein the means for determining measures a femto node pathloss to the femto node, and determines the second pathloss at the potential device to the femto node at least in part by applying a coverage area of the femto node.

18. The apparatus of claim 15, further comprising means for receiving a measurement report from at least one mobile device comprising the second pathloss from the at least one mobile device to the femto node and the first pathloss from the at least one mobile device to the macrocell base station.

19. A non-transitory computer-readable medium storing computer executable code for managing uplink interference between devices communicating with a femto node and a macrocell base station, comprising:
code for causing at least one computer to determine a first pathloss at a potential device communicating with a femto node to a macrocell base station;
code for causing the at least one computer to determine a second pathloss at the potential device to the femto node; and
code for causing the at least one computer to generate a rise-over-thermal (RoT) threshold for the femto node based at least in part on a difference between the first pathloss and the second pathloss and a maximum interference level at the macrocell base station.

20. The computer-readable medium of claim 19, wherein the code for causing the at least one computer to determine determines the first pathloss in part by measuring a femto node pathloss from the femto node to the macrocell base station, and determines the second pathloss based on a coverage area of the femto node.

21. The computer-readable medium of claim 19, further comprising code for causing the at least one computer to measure a femto node pathloss to the femto node, and the code for causing the at least one computer to determine determines the second pathloss at the potential device to the femto node in part by applying a coverage area of the femto node.

22. The computer-readable medium of claim 19, further comprising code for causing the at least one computer to receive a measurement report from at least one mobile device comprising the second pathloss from the at least one mobile device to the femto node and the first pathloss from the at least one mobile device to the macrocell base station.

23. An apparatus for managing uplink interference between devices communicating with a femto node and a macrocell base station, comprising:
a device pathloss determining component for determining a first pathloss at a potential device communicating with a femto node to a macrocell base station and determining a second pathloss at the potential device to the femto node; and
a rise-over-thermal (RoT) threshold computing component for generating a RoT threshold for the femto node based at least in part on a difference between the first pathloss and the second pathloss and a maximum interference level at the macrocell base station.

24. The apparatus of claim 23, wherein the device pathloss determining component determines the first pathloss in part by measuring a femto node pathloss from the femto node to the macrocell base station, and determines the second pathloss based on a coverage area of the femto node.

25. The apparatus of claim 23, wherein the device pathloss determining component measures a femto node pathloss to the femto node, and determines the second pathloss at the potential device to the femto node at least in part by applying a coverage area of the femto node.

26. The apparatus of claim 23, further comprising a measurement report receiving component for receiving a measurement report from at least one mobile device comprising the second pathloss from the at least one mobile device to the femto node and the first pathloss from the at least one mobile device to the macrocell base station.

27. The apparatus of claim 23, further comprising a measurement report receiving component for receiving one or more measurement reports from one or more mobile devices comprising a plurality of femto node pathlosses from the one or more mobile devices to the femto node and a plurality of macrocell pathlosses from the one or more mobile devices to the macrocell base station, wherein the device pathloss determining component determines the second pathloss based on the plurality of femto node pathlosses and the first pathloss is based on the plurality of macrocell pathlosses.

28. The apparatus of claim 23, further comprising a maximum interference determining component for determining the maximum interference level at the macrocell base station based in part on a difference in a first noise floor level of the macrocell base station and a second noise floor level of the femto node.

29. The apparatus of claim 23, further comprising a reverse link (RL) attenuation component for determining a maximum RL attenuation level to be applied to an out-of-cell interference and mapping the RoT threshold to the maximum RL attenuation level, wherein the RoT threshold computing component generates a new RoT threshold as a difference between the RoT threshold and the maximum RL attenuation level.

30. The apparatus of claim 23, wherein the RoT threshold computing component generates the RoT threshold based further on an absolute maximum RoT threshold or an absolute minimum RoT threshold.

31. The apparatus of claim 23, further comprising a RoT threshold enforcing component for indicating a current RoT relative to the RoT threshold to one or more devices.

32. The apparatus of claim 23, further comprising a RoT threshold enforcing component for communicating commands to one or more devices to adapt uplink data rates based in part on a current RoT relative to the RoT threshold.

* * * * *